US008922390B2

(12) United States Patent
Stählin et al.

(10) Patent No.: US 8,922,390 B2
(45) Date of Patent: Dec. 30, 2014

(54) DEVICE AND METHOD FOR C2X COMMUNICATION

(75) Inventors: Ulrich Stählin, Eschborn (DE); Marc Menzel, Weimar/Lahn (DE)

(73) Assignee: Continental Teves AG & Co. oHG (DE)

(*) Notice: Subject to any disclaimer, the term of this patent is extended or adjusted under 35 U.S.C. 154(b) by 95 days.

(21) Appl. No.: 13/812,564

(22) PCT Filed: Jul. 20, 2011

(86) PCT No.: PCT/EP2011/062439
§ 371 (c)(1),
(2), (4) Date: Jan. 28, 2013

(87) PCT Pub. No.: WO2012/013553
PCT Pub. Date: Feb. 2, 2012

(65) Prior Publication Data
US 2013/0120159 A1 May 16, 2013

(30) Foreign Application Priority Data

Jul. 29, 2010 (DE) .......................... 10 2010 038 640

(51) Int. Cl.
*G08G 1/00* (2006.01)
*G08G 1/16* (2006.01)
*H04L 29/08* (2006.01)
*H04L 29/06* (2006.01)

(52) U.S. Cl.
CPC ................. *G08G 1/00* (2013.01); *G08G 1/161* (2013.01); *H04L 67/322* (2013.01); *H04L 67/12* (2013.01); *H04L 69/14* (2013.01)
USPC .......................................... 340/902; 701/431

(58) Field of Classification Search
USPC ............ 340/902, 435, 539.21, 903, 901, 904, 340/436; 726/22; 701/300, 301
See application file for complete search history.

(56) References Cited

U.S. PATENT DOCUMENTS 7,277,028 B1 * 10/2007 Janke ............................ 340/905
7,499,675 B2 * 3/2009 Tsuzuki et al. ................. 455/73

(Continued)

FOREIGN PATENT DOCUMENTS

DE   11 2006 002 632 T5   8/2008
DE   10 2008 060 231      6/2009

(Continued)

OTHER PUBLICATIONS

Christian Wewetzer, et al. "Experimental Evaluation of UMTS and Wireless LAN for Inter-Vehicle Communications", Telecommunications, IEEE, 2007, pp. 1-6.

(Continued)

*Primary Examiner* — Toan N Pham
(74) *Attorney, Agent, or Firm* — RatnerPrestia

(57) ABSTRACT

A method for the communication of a vehicle with at least one further vehicle and/or for the communication of a vehicle with an infrastructure device (C2X communication), wherein the communication serves to transmit at least one information item for application in a driver assistance system and/or a safety system of the vehicle. In order to ensure good safety and reliability of the driver assistance system or safety system in the case of low market penetration of C2X communication, the at least one information item is transmitted via a first communication channel and/or via a second communication channel in dependence on its nature, wherein the first communication channel has a longer latency period than the second communication channel. The invention also describes a corresponding communication device, a corresponding driver assistance system or a corresponding safety system, a corresponding vehicle, a program element and a computer-readable medium.

15 Claims, 1 Drawing Sheet

(56) References Cited

U.S. PATENT DOCUMENTS

| | | |
|---|---|---|
| 8,280,583 B2 | 10/2012 | Stählin et al. |
| 2006/0221933 A1 | 10/2006 | Bauer et al. |
| 2007/0078570 A1 | 4/2007 | Dai et al. |
| 2009/0016245 A1 | 1/2009 | Karls |
| 2010/0241354 A1 | 9/2010 | Stählin et al. |
| 2010/0303048 A1 | 12/2010 | Stählin et al. |

FOREIGN PATENT DOCUMENTS

| | | |
|---|---|---|
| DE | 10 2008 061 304 | 7/2009 |
| DE | 10 2010 002 092 | 12/2010 |
| EP | 1 998 588 | 12/2008 |
| EP | 2 146 486 | 1/2010 |
| WO | WO 2009/005633 | 5/2009 |

OTHER PUBLICATIONS

Brian Gallagher et al., Wireless Communications for Vehicle Safety: Radio Link Performance & Wireless Connectivity Methods, IEEE Vehicular Technology Magazine, IEEE, vol. 1, No. 4, Dec. 2006, pp. 4-24.

International Search Report corresponding to application No. PCT/EP2011/062439, dated Aug. 13, 2012.

* cited by examiner

DEVICE AND METHOD FOR C2X COMMUNICATION

CROSS REFERENCE TO RELATED APPLICATIONS

This application is the U.S. National Phase Application of PCT International Application No. PCT/EP2011/062439, filed Jul. 20, 2011, which claims priority to German Patent Application No. 10 2010 038 640.5, filed Jul. 29, 2010, the contents of such applications being incorporated by reference herein.

FIELD OF THE INVENTION

The present invention relates to a method for the communication of a vehicle with at least one further vehicle and/or for the communication of a vehicle with an infrastructure device wherein the communication serves to transmit at least one information item for application in a driver assistance system and/or a safety system of the vehicle. The invention also relates to a corresponding communication device and to a driver assistance system, a safety system for a vehicle, a vehicle, a program element and a computer-readable medium.

BACKGROUND OF THE INVENTION

In vehicle-to-vehicle communication (C2C communication) and vehicle-to-infrastructure communication (briefly C2I communication in the text which follows), vehicles communicate with other vehicles or vehicles communicate with infrastructure devices. This communication is also called C2X communication overall. Such C2X systems are used, in particular, for exchanging information (data) for application in a driver assistance system and/or a safety system of vehicles.

At the interface between research and development and the application of driver-assistance or safety systems of vehicles, intensive discussions are currently being carried out on the subject of how C2X communication can be introduced into the market. In this context, the main subject of discussion is time and again how, even at low market penetration rates, the customer can be presented with a benefit of C2X communication which can be correspondingly marketed and thus also sold. A further important aspect in the introduction of C2X communication for application in driver assistance and safety systems of vehicles is the safety and reliability of the systems which must be guaranteed even at low penetration rates of the C2X communication.

From WO 2009/056533 A1, which is incorporated by reference, a method for the assessment of data of a digital map for a vehicle is known in which data are assessed on the basis of a map-related quality information item and/or on the basis of measurement data of an environment sensor system of the vehicle and this assessment is subsequently transferred to a driver assistance system and/or a safety system of the vehicle. In this context, the driver assistance system and/or the safety system uses the data of the digital map on the basis of the assessment. By means of the assessment, the system can then decide the extent to which it wishes to utilize the digital map data. The assessment of the data here relates to, among other things, a determination of a currency of the data. Furthermore, measuring accuracy, the deviation of the GPS position of the vehicle and the map-matching position determined by the navigation system, the frequency of the data or the type of data can also be used as quality information. On the basis of the assessment of the data, these can then be used, for example, at various levels of the map data since the requirements for the different levels are different.

The known method can be useful for using the information conveyed but does not bring any advantages for the communication of the vehicles with one another or between the vehicles and the infrastructure devices.

From the printed document 102010002092.3, which is incorporated by reference, a communication device for C2X communication is also known in which data received by means of a data preprocessing unit are preprocessed and are forwarded thereafter to an application of the communication partner. The preprocessing of the data can include, for example, a data reduction or a data plausibility check, a data correction or a data validation. Furthermore, a quality improvement of the data can also be performed. By means of the preprocessing of the data, these can be matched to the corresponding applications. As a result, the processing of the data becomes more efficient and targeted. This known device also has the aim of improving the processing of the data in the communication device. This will not influence the communication.

SUMMARY OF THE INVENTION

An aspect of the present invention provides an improved method and creating an improved device which guarantees, especially in the case of little market penetration of the C2X communication for driver assistance systems and/or safety systems of vehicles, the required safety and reliability of the systems. An aspect also comprising a corresponding communication device, a corresponding vehicle, a corresponding driver assistance system or safety system, a corresponding program element and a corresponding computer-readable medium.

This is achieved by the method for the communication of a vehicle with at least one further vehicle and/or for the communication of the vehicle with an infrastructure device, wherein the communication serves to transmit at least one information item for application in a driver assistance system and/or a safety system of the vehicle, wherein the at least one information item is transmitted via a first communication channel and/or via a second communication channel in dependence on its nature, and wherein the first communication channel has a longer latency period than the second communication channel.

In particular, the at least one information item (data) is transmitted via a first communication channel and/or via a second communication channel in dependence on its nature, wherein the first communication channel has a greater (higher, longer) latency period than the second communication channel.

In this context, the latency time between event and creation of the respective information item and reception of the respective information item in the relevant vehicle or the infrastructure device is measured.

The method according to an aspect of the invention is based on a combination of different communication technologies which have different characteristics with regard to the latency. The reliability and safety of the driver assistance and/or safety systems of vehicles is increased as a result of the fact that, for example, in the case of the transmission of information which is relevant to safety or occurs aperiodically, respectively, a communication technology (second communication channel) is used which has a short latency period. By comparison, information which, for example, describes the environment of the vehicle and is not safety-critical can be transmitted via the first communication channel.

Accordingly, the nature of the information is determined from its content and/or its creation and/or its use in the respective safety and/or driver assistance system. In particular, the relevance to safety and the dynamics of the respective information (data) are the determining factor.

The range from 50 ms to 100 ms is preferably considered to be the limit of the latency period. It is assumed that the first communication channel has a longer (higher) latency period than 50 ms to 100 ms; the latency period of the second communication channel should be within a range of from 50 ms to 100 ms or below. This limit corresponds to the Traffic Classes which are currently being standardized with C2X. The limit between the latency period of the first and the second communication channel should be within the range of 250 ms at the maximum. This means that the latency period of the second communication channel is 250 ms at the maximum, preferably 100 ms at the maximum, especially preferably 50 ms at the maximum.

According to an aspect of the invention, the following combinations of communication technologies can be used. The first communication channel is preferably a mobile radio channel and the second communication channel is a WLAN channel or the first communication channel is a mobile radio channel and the second communication channel is a transponder channel, preferably in the sub-GHz band, or the first communication channel is a WLAN channel and the second communication channel is a transponder channel, preferably in the sub-GHz band, or the first communication channel is a WLAN channel according to a first WLAN sub-type and the second communication channel is a WLAN channel according to a second WLAN sub-type, wherein the WLAN channel according to the first WLAN sub-type and the WLAN channel according to the second WLAN sub-type are arranged preferably in different frequency bands.

The mobile radio technology, especially the cellular mobile radio technology used in the Cooperative Cars (CoCar or CoCarX) project has a comparatively high latency period of approx. 300 ms (depending on the basic communication technology used) and is therefore predestined for sending out periodically occurring or static information. In this context, it is of advantage that large volumes of data can be transmitted. In particular, a third-generation mobile radio standard (e.g. UMTS) or a fourth-generation standard is used as preferred mobile radio technology in the CoCar project. This mobile radio generation is being developed in the Next Generation Mobile Networks (NGMN) project and is intended to be based on the previous UMTS infrastructures. NGMN is based on OFDM. Other possibilities are LTE or comparable technologies.

WLAN is a further communication standard via which information can be transmitted with a shorter latency period compared with mobile radio. In particular, the IEEE 802.11p standard, which promises very short latency periods of less than 50 ms, is of significance for the C2X WLAN communication in vehicles. Typically, implementations according to the IEEE 802.11a/b/g/n standards are designated as "normal" WLAN, the latency periods in each case being greatly dependent on the communication mode used. IEEE 802.11p operates in a dedicated frequency band at approx. 5.9 GHz, whereas the other WLAN sub-types operate in free frequency bands at 2.4 GHz and/or 5 GHz. In the present application, a WLAN implementation according to a predetermined standard of the IEEE 802.11 family is understood to be a WLAN sub-type, for example IEEE 802.11a, IEEE 802.11b, IEEE 802.11g, IEEE 802.11n, IEEE 802.11p etc.

The communication by means of transponder in the radio wave band, preferably in the sub-GHz band has a very short latency period of typically less than 50 ms. This communication technology is frequently used in the vehicle in conjunction with the so-called Remote Keyless Entry (RKE). This communication has only a short range and consequently can only be applied for communication between vehicles arranged very closely next to one another or between vehicle and close infrastructure device. RKE is primarily a system for creating access to a vehicle or other devices by means of a radio remote control. However, there are already extensions which additionally also provide for communication from the vehicle or another device, respectively, back to the radio remote control, partially with distinctly enhanced range of, for example, 500 m. RKE typically operates in freely available frequency bands of, e.g., 434 MHz or 868 MHz (Europe).

In a further preferred exemplary embodiment, periodically occurring or static information which does not have a high demand on latency is transmitted via the first communication channel. It is also of advantage if safety-related, dynamic and/or event-based information is transmitted via the second communication channel. For example, data are sent out which describe the environment of the vehicle in order to provide the vehicle with a rough image of the environment. In this context, interesting information is, in particular, the positions, the speed and the direction of movement of the vehicle and a time stamp but, e.g. also turn-signal status, probable route, etc. Using this data, the vehicle supplied with the information can generate an image of the environment in a particularly simple manner. Such information is sent out, for example, periodically via a mobile radio communication channel. On the basis of the rough image of the environment of the vehicle thus determined, it is then possible to detect a possible risk to one's own vehicle in a rapid and simple manner.

Information containing hazard situations is mostly dynamic or safety related or event-based information which is then transmitted via the second communication channel having the shorter latency period. It is thus quickly available in the vehicle and, as a result, renders the safety or driver assistance systems safer. The dynamic or event-based data can be sent out, for example, by means of RKE. In this context, the safety-related, dynamic or event-based messages typically do not present a problem to the network loading since they are not sent out so frequently.

It is also of advantage when information is transmitted periodically via the first communication channel. Periodic messages (so-called beacons or cooperative awareness messages (CAM)) typically load the communication channel heavily since they are frequently sent. A model of the environment of the vehicle can also be generated from the periodic data and actions can be derived from these. It is thus of advantage if these so-called beacons are transmitted via the communication channel which has a greater latency period and a higher band width.

If the vehicle detects, e.g. from a model of the environment, that a predetermined hazard potential is exceeded, safety-related information and/or event-based information is preferably transmitted via the second communication channel. For example, it can be determined whether a predetermined hazard potential is exceeded in that the "Time to Collision" with another vehicle or another device for the respective vehicle is determined at the respective time and it is checked whether the time determined exceeds a predetermined threshold value. In the case of the "Time to Collision", such a threshold value is, for example, 4 seconds. If the predetermined threshold value is exceeded, there is a hazard. All information which requires an intervention of the driver assistance system and/or of the safety system in the vehicle is also preferably transmitted via the second communication channel.

It is also of advantage if the at least one information item is preprocessed before the transmission, especially with regard to its suitability for transmission via the first communication channel and/or via the second communication channel. For example, safety-related information or information items which require an intervention of the safety system in the vehicle can be identified from the stream of information, and these can then be forwarded to the relevant vehicle by means of the second communication channel. The remaining information items are transmitted via the first communication channel.

To be able to generate a better description of the environment, map information, e.g. the position of intersections, branches, the course of traffic lanes (important, e.g. in the case of building sites) etc. or relevant topographic features, for example domes, heavy house construction etc. are sent periodically via the first communication channel, especially by means of CoCar mobile radio communication. Transmitters for such information for describing the environment can be, e.g. light signal installations, traffic light installations, etc.

It is also of advantage, for example in the communication via transponder (e.g. via RKE), to adapt the radiated power, and thus the range of the communication, to the corresponding situation. Since it is already known, due to the periodically transmitted information, what the nature of the environment of the vehicle is, it can be estimated by means of this information what communication range is necessary. The determination of the range is only difficult in situations comprising large differences in speed or unfavorable topographic situations. In these cases, a standard range can be set.

Applications in the vehicle which do not have a high demand on the latency period can also be supplied with information only with the aid of the first communication channel, for example by means of CoCar mobile radio communication. This includes partially local hazard warnings but mainly mobility applications such as congestion information, information about construction sites, traveling time information etc. It is only within a short period after the occurrence of events that it is of advantage to transmit the respective information additionally also via a second communication channel having a lesser latency period so that all vehicles in the immediate vicinity of the event can be warned rapidly.

By means of the method according to an aspect of the invention, the occurrence of a hazard for the vehicle is determined by communication via the first communication channel having a large bandwidth but higher latency period. The second communication channel, which has a lesser latency period and in most cases also a lesser data rate, is included preferably in the case of a threatening hazard. Via the second communication channel, the few dynamic information items critical for the safety of the vehicle are transmitted. By this means, the characteristics of both communication channels can be combined advantageously with one another.

Since the communication channels discussed, mobile radio communication, WLAN communication and/or communication by means of transponder (RKE) are already available in many vehicles, the present invention only provides for a multiple use of the communication channels already existing. This is an optimum use of the channels with respect to costs. The mobile radio technology in CoCar (for example UMTS/LTE/WiMAX/ . . . ) is used primarily, for example, for the "traditional" telematics, eCall or Internet reception in the car. The RKE communication is used primarily for TPMS (tire pressure monitoring system) and for access control.

The above aspect is also achieved by a communication device of a vehicle with at least one further vehicle and/or for the communication of the vehicle with an infrastructure device, wherein the communication serves to transmit at least one information item for application in a driver assistance system and/or a safety system of the vehicle, wherein the communication device, in particular, has a first communication channel and a second communication channel, wherein the at least one information item can be transmitted via the first communication channel and/or the second communication channel in dependence on its nature and wherein the first communication channel has a greater latency period than the second communication channel. In this context, the latency period between an event or the creation of the respective information and the reception of the respective information in the relevant vehicle or the infrastructure device can be measured.

The features specified above in conjunction with the method according to the invention also apply to the device according to the invention having the corresponding advantages.

This is also achieved by a driver assistance system or a safety system for a vehicle comprising a communication device according to the invention, described above.

Furthermore, the above aspect is achieved by a vehicle comprising a communication device according to the invention, described above, and by a program element which, when it is executed on a processor of a communication device, directs the communication device to perform the method according to the invention, specified above. The object is also achieved by a computer-readable medium on which such a program element is stored.

BRIEF DESCRIPTION OF THE DRAWINGS

The invention is best understood from the following detailed description when read in connection with the accompanying drawings. Included in the drawings is the following figures.

Diagrammatically shown is in.

DETAILED DESCRIPTION OF THE PREFERRED EMBODIMENTS

Figure 1:
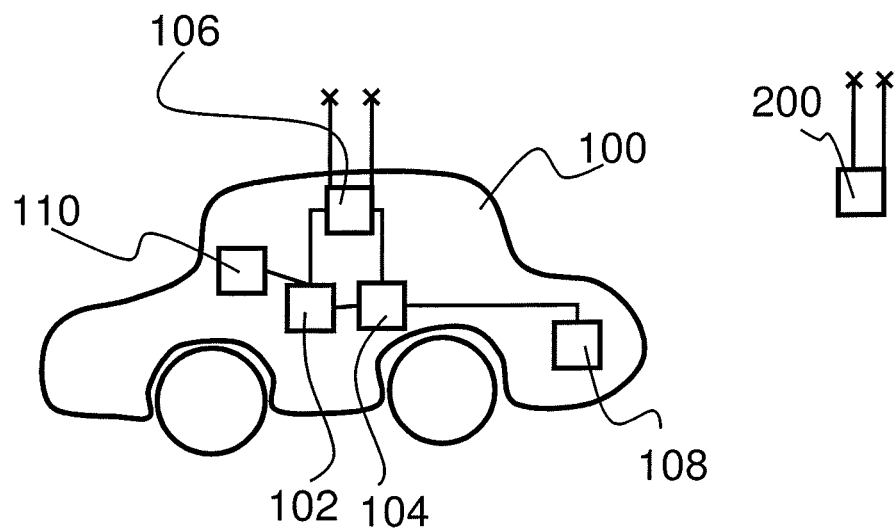
FIG. 1 a vehicle according to the invention having a device according to the invention for communication and an infrastructure device, and FIG. 2 a situation at an intersection in which the method according to the invention for communication is used.

The vehicle 100 shown in FIG. 1 has a driver assistance system 102 and a safety system 104 which communication with one another.

The safety system in a vehicle is an electronic device which is used for improving the safety when traveling, particularly in hazard situations. Such a system is intended to prevent damage to vehicles or persons. The safety system 104 can be implemented, for example, as an anti-blocking system (ABS), an airbag system, an electronic stability program (ESP), a belt tightening system or an impact protection system.

Driver assistance systems (also called advanced driver assistance system) (ADAS)) are electronic devices in vehicles for supporting the driver in various driving situations. This primarily includes safety aspects or the enhancement of the driving comfort. A further aspect is the improvement of the driving economy. Such systems are, for example, adaptive cruise control (ACC), distance warning system, parking aid, track changing assistance, dead-angle monitoring, distance control, track departure alarm, traffic signal detection etc.

The safety system 102 and the driver assistance system 104 are connected to a communication device 106. This has a first communication channel, for example a CoCar mobile radio channel and a second communication channel, for example an RKE transponder channel. For this purpose, the communication device 106 is equipped with a respectively suitable transmitter and a respectively correspondingly configured receiver for each communication channel. The communication device, therefore, has two transmitters and two receivers. In FIG. 1, the existence of two communication channels in the communication device 106 is indicated by two antennas.

As an alternative, the communication device can also be integrated in the safety system and/or the driver assistance system.

As a further alternative, both the communication device and the safety system or the driver assistance system can be integrated in a control device of the vehicle.

As a further alternative, the first communication channel can be integrated in a first communication device and the second communication channel can be integrated in a second communication device.

The safety system 102 and the driver assistance system 104 are also connected to an environment sensor 108, for example a camera, an ultrasonic sensor, a radar sensor or a lidar sensor. By means of the environment sensor 108, information with respect to the environment of the vehicle such as the distance from other vehicles or infrastructure devices or geographic conditions etc. can be determined.

The vehicle also has a memory 110 in which, for example, digital map data are stored. The memory 110 is also connected to the safety system 102 and the driver assistance system 104.

In FIG. 1, an infrastructure device 200 is also shown which also has a communication device comprising the first communication channel, for example the CoCar mobile radio channel, and the second communication channel, for example the RKE transponder channel.

The vehicle 100 is capable of communicating by means of the communication device 106 with other vehicles or the infrastructure device 200 via the two communication channels in order to exchange information for the use in the safety system 102 and in the driver assistance system 104.

In the text which follows, the mode of operation of the vehicle components, explained by means of FIG. 1, and of the infrastructure device 200 will be explained by means of examples.

EXAMPLE 1

By means of the environment sensor 108 or due to a braking intervention, the vehicle 100 detects a smooth road having a correspondingly low friction coefficient. Immediately after the detection of the low friction coefficient, at least the friction coefficient and the location at which the low friction coefficient has been detected is sent for a few 100 milliseconds to other vehicles via the second communication channel, for example the RKE communication channel having the low latency period since the hazard situation must be forwarded rapidly to other vehicles.

However, this information is contemporaneously sent out also via the first communication channel, for example the CoCar communication channel. Sending the information via this communication channel can be stopped after some time since the intelligence in the communication network ensures that the information is retained.

The low friction coefficient is used in the respective vehicle, for example in a distance alarm or ESP.

Further local hazard warnings, for example about building sites, wet road surface etc. are treated similarly.

EXAMPLE 2

The vehicle 100 sends its position and other basic data, for example the speed and in each case a time stamp periodically via the first mobile radio channel, for example the CoCar mobile radio channel by means of the communication device. On the basis of this data, the vehicle 100 generates from its environment an environment model. If the vehicle 100 then detects that it is approaching an intersection, a check is made whether another vehicle having the same direction of movement is also approaching the intersection.

Figure 2:
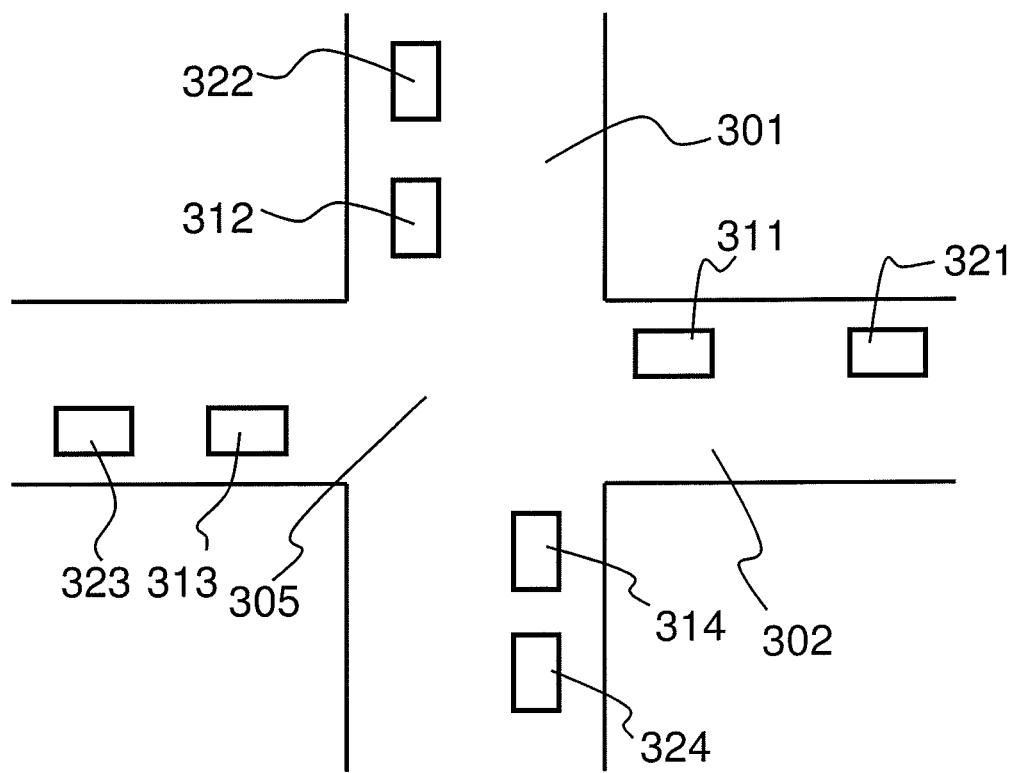

Such a situation is shown by means of FIG. 2. The roads 301 and 302 intersect at the intersection 305. The vehicles 311, 312, 313, 314, 321, 322, 323, 324 approach the intersection 305. Using the environment model which is determined in each vehicle 311 to 324, the vehicles 311, 312, 313, 314 find out that they are nearest to the intersection and will soon cross the intersection 305. These vehicles will then send out with high repetition rate data such as speed or location of the vehicle via the second communication channel (e.g. RKE communication channel) in order to provide for a rapid reaction in case of danger since the second communication channel has a lower latency period.

The data transmitted via the second communication channel are also used in vehicles 311, 312, 313, 314 in the distance alarm, ESP or ABS.

Vehicles 321, 322, 323, 324 are at a greater distance from the intersection 305 so that the data are sent out there only via the first communication channel (e.g. CoCar communication channel).

EXAMPLE 3

Vehicle 100 is driving closely behind a second vehicle. Each vehicle determines by analyzing the situation that a collision threatens in the case of rapid braking. Therefore, static data such as mass, lengths etc. are exchanged prophylactically via the first communication channel, for example a CoCar mobile radio channel.

If then the "rapid braking" event occurs, only dynamic information relating to this event is sent out via the second communication channel, for example an RKE communication channel. The radiated power via the second communication channel is low since the data need to be exchanged only between two vehicles following one another.

List of Reference Designations
100 Vehicle
102 Safety system
104 Driver assistance system
106 Communication device
108 Environment sensor
110 Memory
200 Infrastructure device 301, 302 Road
305 Intersection
311, 312 Vehicle
313, 314 Vehicle
321, 322 Vehicle
323, 324 Vehicle

The invention claimed is:

1. A method for the communication of a vehicle with at least one of a further vehicle and an infrastructure device, the method comprising:
 transmitting, by a transmitter, at least one information item for application in at least one of a driver assistance system and a safety system of the vehicle:
  via a first communication channel in response to a processor determining that the at least one information item is not time critical for safety of the vehicle,
  via a second communication channel in response to the processor determining that the at least one information item is time critical for safety of the vehicle, and
 wherein the first communication channel has a longer latency period than a latency period of the second communication channel.

2. The method as claimed in claim 1, wherein either
 i) the first communication channel is a mobile radio channel and the second communication channel is a WLAN channel,
 ii) the first communication channel is a mobile radio channel, and the second communication channel is a transponder channel, in the sub-GHz band,
 iii) the first communication channel is a WLAN channel and the second communication channel is a transponder channel, in the sub-GHz band,
 or
 iv) the first communication channel is a WLAN channel according to a first WLAN sub-type and the second communication channel is a WLAN channel according to a second WLAN sub-type, wherein the WLAN channel according to the first WLAN sub-type and the WLAN channel according to the second WLAN sub-type are in different frequency bands.

3. The method as claimed in claim 1, wherein periodically occurring or static information is transmitted via the first communication channel.

4. The method as claimed in claim 1, wherein information is transmitted periodically via the first communication channel.

5. The method as claimed in claim 1, wherein at least one of safety-related information and event-based information is transmitted via the second communication channel, when a predetermined hazard potential is exceeded.

6. The method as claimed in claim 1, wherein the at least one information item is preprocessed before the transmission, with regard to suitability of the at least one information item for transmission via the first communication channel and/or the second communication channel.

7. A device for the communication of a vehicle with at least one of a further vehicle and an infrastructure device, the device comprising:
 a processor; and
 a transmitter, controlled by the processor, for transmitting at least one information item for application in at least one of a driver assistance system and a safety system of the vehicle:
  via a first communication channel in response to the processor determining that the at least one information item is not time critical for safety of the vehicle,
  via a second communication channel in response to the processor determining that the at least one information item is time critical for safety of the vehicle, and
 wherein the first communication channel has a longer latency period than a latency period of the second communication channel.

8. The device as claimed in claim 7, wherein either
 i) the first communication channel is a mobile radio channel and the second communication channel is a WLAN channel,
 ii) the first communication channel is a mobile radio channel and the second communication channel is a transponder channel, in the sub-GHz band,
 iii) the first communicational channel is a WLAN channel and the second communication channel is a transponder channel, in the sub-GHz band,
 or
 iv) the first communication channel is a WLAN channel according to a first WLAN sub-type and the second communication channel is a WLAN channel according to a second WLAN sub-type, wherein the WLAN channel according to the first WLAN sub-type and the WLAN channel according to the second WLAN sub-type are in different frequency bands.

9. The device as claimed in claim 7, wherein periodically occurring or static information can be transmitted via the first communication channel.

10. The device as claimed in claim 7, wherein information can be transmitted periodically via the first communication channel.

11. The device as claimed in claim 7, wherein safety-related information and/or event-based information can be transmitted via the second communication channel, when a predetermined hazard potential is exceeded.

12. The device as claimed in claim 7, wherein the at least one information item can be preprocessed before the transmission, especially with regard to suitability of them at least one information item for transmission via the first communication channel and/or the second communication channel.

13. A driver assistance system or safety system for a vehicle comprising:
 a processor of the vehicle; and
 a communication device of the vehicle;
 wherein the communication device is controlled by the processor to transmit at least one information item for application in at least one of a driver assistance system and a safety system of the vehicle:
  via a first communication channel in response to a processor determining that the at least one information item is not time critical for safety of the vehicle,
  via a second communication channel in response to the processor determining that the at least one information item is time critical for safety of the vehicle, and
 wherein the first communication channel has a longer latency period than a latency period of the second communication channel.

14. A vehicle comprising:
 a processor; and
 a communication device of a vehicle;
 wherein the communication device is controlled by the processor to transmit at least one information item for application in at least one of a driver assistance system and a safety system of the vehicle:
 via a first communication channel in response to a processor determining that the at least one information item is not time critical for safety of the vehicle, via a second communication channel in response to the processor determining that the at least one information item is time critical for safety of the vehicle, and wherein the first communication channel has a longer latency period than a latency period of the second communication channel.

15. A non-transitory computer-readable medium on which a method for the communication of a vehicle with at least one of a further vehicle and an infrastructure device, the method comprising:

transmitting, by a transmitter, at least one information item for application in at least one of a driver assistance system and a safety system of the vehicle:

via a first communication channel in response to a processor determining that the at least one information item is not time critical for safety of the vehicle, via a second communication channel in response to the processor determining that the at least one information item is time critical for safety of the vehicle, and wherein the first communication channel has a longer latency period than a latency period of the second communication channel.

\* \* \* \* \*